United States Patent
Mikeska et al.

[19]

[11] Patent Number: 6,123,622
[45] Date of Patent: Sep. 26, 2000

[54] PROTECTIVE DEVICE FOR A DRIVESHAFT

[75] Inventors: Felix Mikeska, Lohmar; Wilhelm Schott, Köln; Karl Coenen, Siegburg, all of Germany

[73] Assignee: GKN Walterscheid GmbH, Lohmar, Germany

[21] Appl. No.: 09/167,789

[22] Filed: Oct. 7, 1998

[30] Foreign Application Priority Data

Oct. 8, 1997 [DE] Germany ............................ 197 44 314

[51] Int. Cl.$^7$ ....................................... F16C 1/26
[52] U.S. Cl. ...................... 464/172; 464/175; 277/636; 277/637
[58] Field of Search .................... 464/172, 173, 464/112, 113, 131, 175; 277/634, 635, 636, 637

[56] References Cited

U.S. PATENT DOCUMENTS

| | | | |
|---|---|---|---|
| 3,053,062 | 9/1962 | Geisthoff | 464/172 |
| 3,866,440 | 2/1975 | Stananought . | |
| 4,403,781 | 9/1983 | Riemscheid | 464/175 |
| 4,443,207 | 4/1984 | Buthe et al. | 464/172 |
| 4,905,871 | 3/1990 | Dutertre | 222/83 |
| 5,800,271 | 9/1998 | Herchenbach et al. | 464/175 |
| 5,961,388 | 10/1999 | Breidenbach et al. | 277/636 |

FOREIGN PATENT DOCUMENTS 0 691 946 A1  3/1995  European Pat. Off. .
953026  11/1956  Germany .

*Primary Examiner*—Kenneth Thompson
*Attorney, Agent, or Firm*—Harness, Dickey & Pierce, P.L.C.

[57] ABSTRACT

A protective device for a driveshaft (1), with two universal joints (2, 3) has a protective cone (6) associated with the first universal joint. The protective cone (6) has an extension in the form of a cone portion (14). A sleeve (15) is received in a rotationally fast way in the cone portion (14). The sleeve (15) cooperates with an adapter ring (21). The adapter ring (21) is stationarily secured to an agricultural implement. The sleeve (15) is positioned on the adapter ring (21). The sleeve has inwardly directed splines which engage correspondingly distributed grooves (23) in the outer face of the adapter ring (21) which achieve a rotationally fast connection. The protective device also includes a first protective tube connected to the first protective cone (6). The first protective tube is associated with a second protective tube of the second universal joint in a rotationally fast way. The second tube is firmly connected to the second protective cone by an attaching cap. The attaching cap is secured to the second universal joint so that the entire protective device remains rotation free.

4 Claims, 3 Drawing Sheets

PROTECTIVE DEVICE FOR A DRIVESHAFT

CROSS-REFERENCE TO RELATED APPLICATION

This application is based upon and claims priority to German Patent Application No. 197 44 314.1 filed Oct. 8, 1997, which is herein expressly incorporated by reference.

BACKGROUND OF THE INVENTION

The invention relates to a protective device for a driveshaft, especially a universal-jointed driveshaft. The driveshaft has two universal joints and a telescopic connecting shaft which connects the joints along a longitudinal axis. Each universal joint has a protective cone and protective tube. The protective tubes are arranged between the cones and are connected to one another in a rotationally fast way. The tubes are displacable inside one another along the longitudinal axis. One of the protective cones and one protective tube are rotatably and axially immovably secured to a universal joint. A first securing means is at the first protective cone and is rotatably connectable to a second securing means intended to be fixed to the stationary part of a machine or a similar component.

Protective devices are preferably used in connection with universal-jointed driveshafts which are used for driving agricultural implements via the power take-off shaft of the tractor. At one end, the devices are connectable to the power take-off shaft of the tractor and, at the other end, are secured to a driving journal of the implement. The protective device protects the rotating driveshaft from being touched. The protective device can be connected to a fixed point of the implement, for example. However, it is also known to provide one of the protective cones, at its free end, with a flange. Circumferentially distributed securing journals provided with undercuts axially project from the flange.

The securing journals engage a slot in a securing element which is connectable to the implement. Furthermore, the securing element has a cone-shaped portion which is used for pre-centering the flange of the protective cone. The cone-shaped portion changes into a cylindrical portion where the flange of the protective cone is centered. In this way, the securing journals projecting from the end face are guided towards the corresponding openings in a radially extending wall of the securing element. After the securing journals are positioned so as to extend through the corresponding slots, the securing operation is effected by rotating the protective cone.

A disadvantage of this design is that handling the device is complicated because from the operation position it is practically impossible to see whether the securing journals are engaged. Furthermore, it is necessary to first find the rotational position which has to be assumed by the protective cone with the securing journals relative to the slots. It is not possible to be sure that locking has actually taken place. This is due to the resilience of the protective cone in the axial direction. Thus, the actual engagement of the securing journals cannot be identified.

SUMMARY OF THE INVENTION

It is an object of the invention to provide complete protection for driveshafts. Thus, all rotating components are completely covered. Further, the invention ensures simple and safe handling operations.

In accordance with the invention, a first securing means, in the form of a sleeve, is firmly connected to a first protective cone. A second securing means, in the form of an adapter ring, is arranged around the sleeve in an assembled condition. The ring and sleeve are connected to one another by a holding means. The holding means enables longitudinal displacement of the sleeve and the adapter ring relative to one another while holding them in a rotationally fast way relative to one another.

An advantage of this embodiment is that the sleeve and adapter ring overlap one another and engage easily. The portions which have to be made to engage one another are within the field of vision of the operative.

According to a preferred embodiment, the sleeve has a bore with inwardly projecting splines. The splines extend parallel to the axis of the bore. The adapter ring, on its outer face, has a contour corresponding to the bore. Also, the outer face has grooves that extend parallel to the axis and engage the splines.

The grooves on the outer face of the adapter ring are easily identifiable and in consequence, positioning of the splines is also easy. The sleeve's cylindrical outer face is received in a cylindrical receiving bore of a cone portion of the protective cone. The two parts can be connected by bolts in order to achieve on the spot adaption. In this way, it is possible to accommodate assembly-related differences in length since the sleeve is displaceable in the receiving bore of the cone portion. This is particularly important in cases of retrofitting, but it is also possible to glue or weld the sleeve to the cone portion. Furthermore, it is possible to provide inter-engaging projections and indentations for connecting purposes.

Because of the axial overlap of the sleeve and adapter ring, the two parts are displaceable relative to one another. To prevent an unintentional disconnection, the adapter ring, towards its end close to the protective cone, on its outside, it has at least one projection. The projection extends radially relative to the axis. The sleeve, at its free end, has a radially outwardly extending securing projection which engages an adapter projection.

The components of the protective device are preferably produced of plastics. The adapter ring can be secured on the gearbox neck of an input of a gearbox in the region of the driving journal projecting from the gearbox neck.

From the following detailed description, taken in conjunction with the drawings and subjoined claims, other objects and advantages of the present invention will become apparent to those skilled in the art.

DETAILED DESCRIPTION OF THE PREFERRED EMBODIMENT

Figure 1:
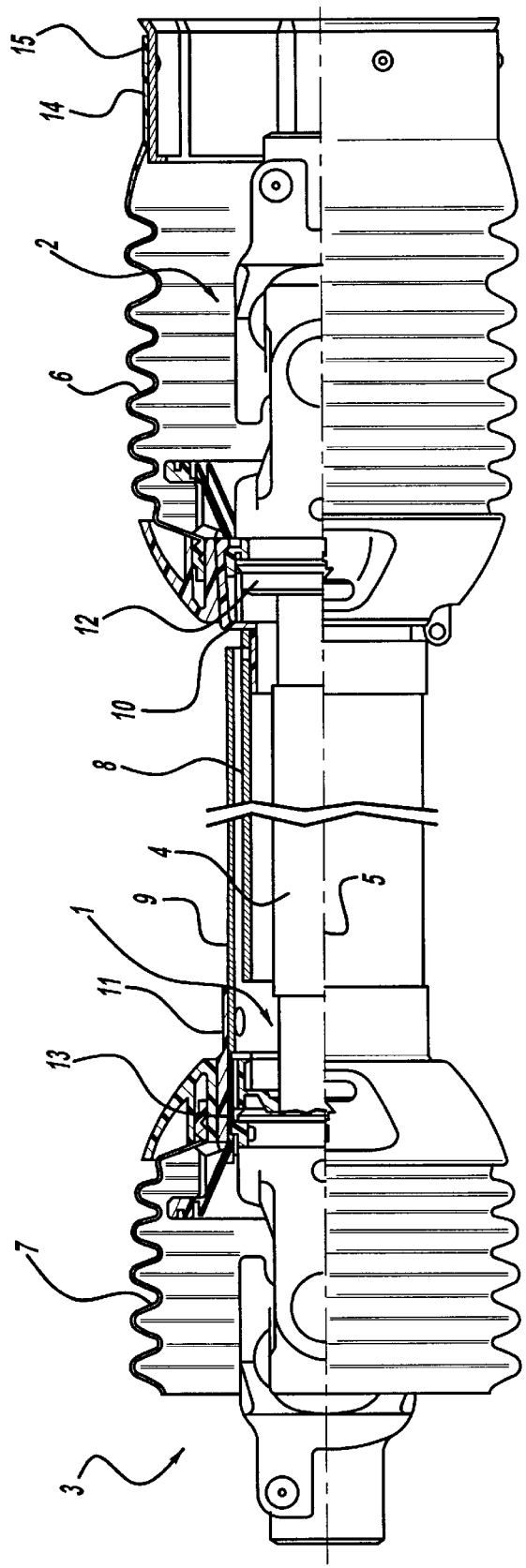
FIG. 1 is a side view partially in section of a driveshaft provided with a protective device in accordance with the present invention.

FIG. 1 illustrates a driveshaft 1 in the from of a universal-jointed shaft with a first universal joint 2 and a second universal joint 3 with a connecting shaft 4 connecting the two joints. In the illustration, all components are centered on the longitudinal axis 5. The universal joints 2, 3 are shown in the aligned condition. The connecting shaft 4 has two profiled tubes which are inserted into one another. The tubes permit the transmission of torque between the two universal joints 2, 3. In the embodiment as illustrated, the drive is effected in that it starts from a journal (not visible) via the second joint 3 and the connecting shaft 4 to the first joint 2. The connecting shaft 4 enables changes in the distance between the two universal joints 2 and 3.

When an agricultural implement is driven by the power take-off shaft of a tractor, the driveshaft therebetween is exposed; in consequence, a protective device is associated with the driveshaft 1. The protective device includes a first protective cone 6 which fully covers the second joint 2.

The protective cone includes a cylindrical cone portion 14 which serves as an extension. When the second universal joint 3 is associated with a power take-off shaft, for example, the protective cone 7 may be shorter because the tractor is usually provided with a protective plate which extends over the protective cone 7. The first protective cone 6 is connected to an attaching cap 10. In addition, the protective cap carries a first protective tube 8 which extends parallel to the longitudinal axis 5. The first protective tube is inserted into a second protective tube 9 which is connected to the attaching cap 11. In addition, the attaching cap 11 carries the second protective cone 7.

The first attaching cap 10, via a sliding ring 12, is held on the driveshaft 1 in a groove of a joint yoke associated with the first universal joint 2. Thus, the cap 10 is rotatable around the longitudinal axis 5. However, in the longitudinal direction, along the longitudinal axis 5, the attaching cap 10 is secured by the sliding ring 12 relative to the joint yoke. Thus, this connection enables longitudinal movements.

As a result of their shape, the two protective tubes 8, 9 engage one another in a rotationally fast way. The second protective tube 9 together with the second protective cone 7 is secured on the attaching cap 11. The cap 11 is connected by a second sliding ring 13 to a joint yoke associated with the second universal joint 3. Thus, the cap is rotatable around the longitudinal axis 5, but immovable along the longitudinal axis 5. This means that the first protective cone 6 and the second protective cone 7 carry out displacement movements together with the associated joints 2, 3. Their two protective tubes 8 or 9 enter one another more or less deeply, depending on whether the distance between the two universal joints 2, 3 is increased or decreased.

A sleeve 15, which will be explained in greater detail below with reference to FIGS. 2 and 3, holds the protective cone 6 rotationally fast around the longitudinal axis 5. The protective cone 6 is firmly connected by the first attaching cap 10 to the first protective tube 8. When the sleeve 15 is kept fast, due to the non-rotating connection with the second protective tube 9 and, via the second attaching cap 11 with the second protective cone 7, the entire protective device is fixed relative to the driveshaft 1 rotating around the longitudinal axis 5.

Figure 2:
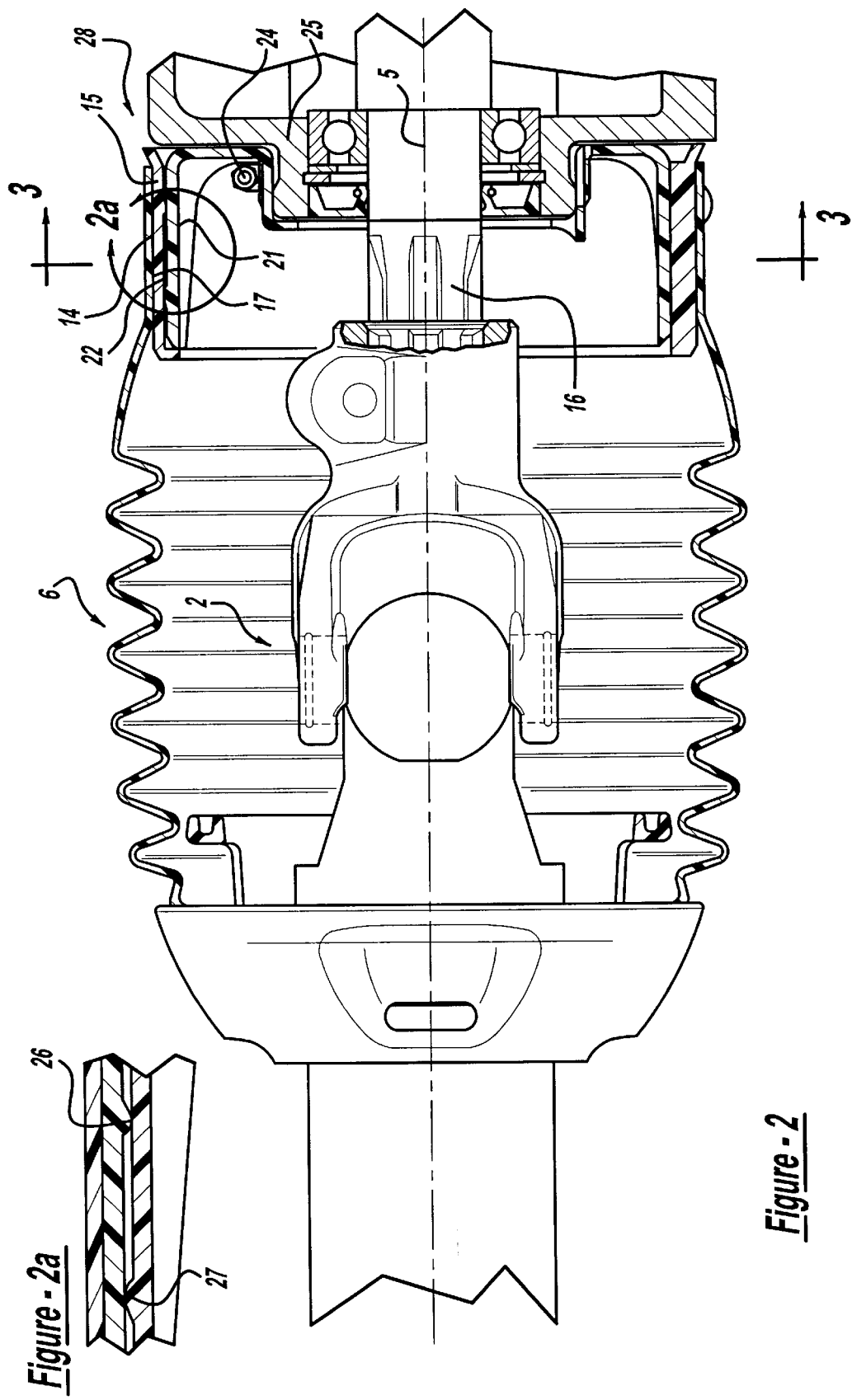
FIG. 2 is an enlarged partial cross-section view of FIG. 1 of a universal joint completely covered by the protective cone.
Figure 3:
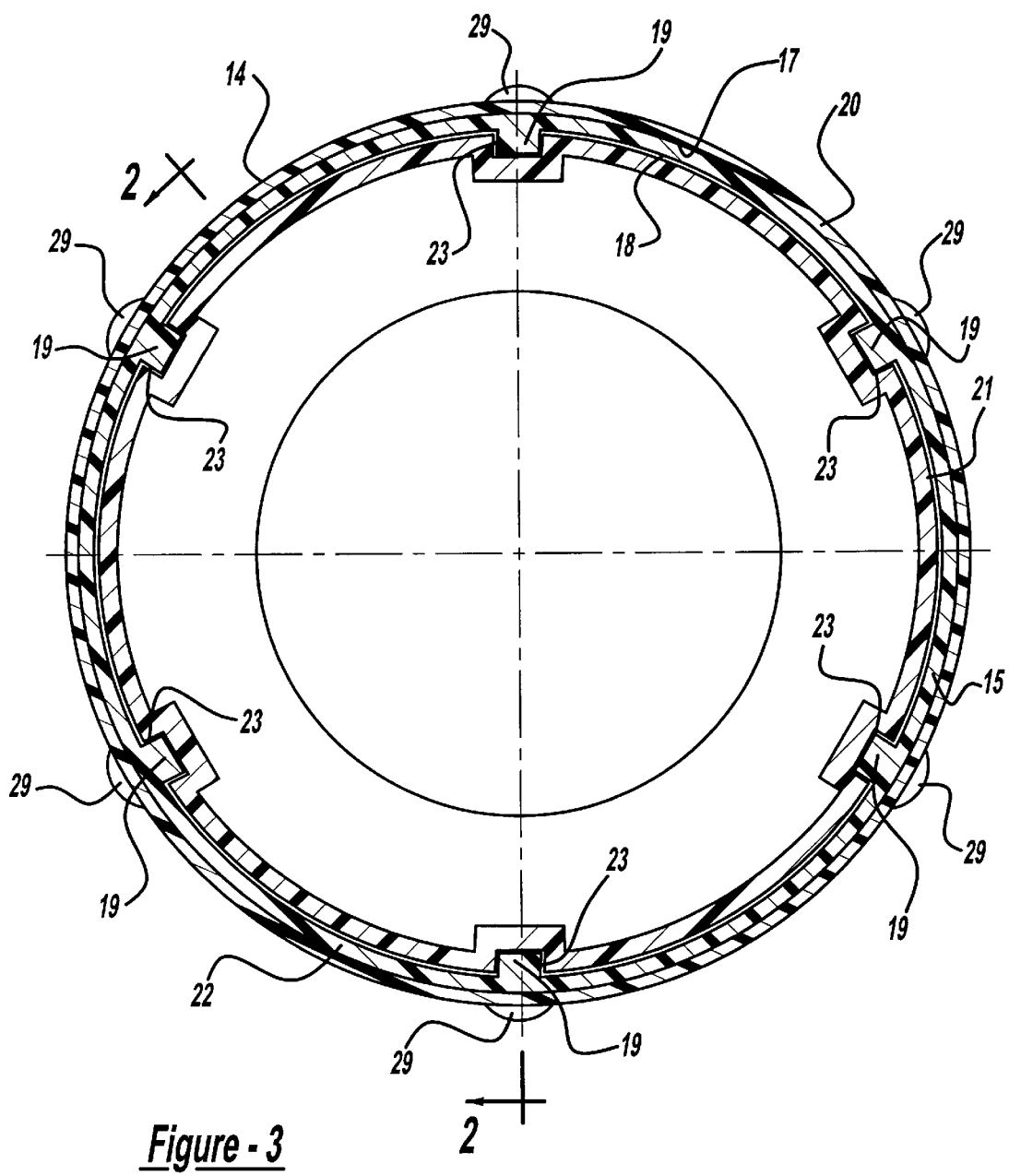
FIG. 3 is a section view along line III—III of FIG. 1.

FIGS. 2 and 3 show the design of the securing means of the first protective cone 6. Also, they illustrate the way which the securing means cooperate with the second securing means which are associated with the agricultural implement.

FIG. 2, in particular, makes it quite clear that the outer joint yoke of the first universal joint 2 is positioned on the driving journal 16 of an implement. For the sake of simplicity, the universal joint 2 is shown in its aligned position. Thus, the axis of rotation of the driving journal 16 coincides with the longitudinal axis 5. This also applies to the receiving bore 17 of the cone portion 14 which receives the sleeve 15 via its cylindrical outer face 20.

Depending on the application, the sleeve 15 can enter the cone portion 14 more or less deeply. The sleeve 15 is connected to the cone portion 14 by a plurality of bolts 29. The bolts 29 are circumferentially distributed around the circumference of the cone portion 14 and extend through its wall. Inwardly projecting splines 19 are circumferentially distributed in the sleeve bore 18. The sleeve 15 is shown in a position where it is slid by its bore 18 onto the outer face 22 of the adapter ring 21. On its outer face 22, the adapter ring 21 has grooves 23 which are circumferentially distributed in accordance with and engage the splines 19 of the sleeve 15. The splines 19 and the grooves 23 extend parallel to the longitudinal axis 15. The adapter ring 21 has an inwardly directed wall portion. A further portion, which is sleeve-like and serves to be slid over the gearbox neck 25 starts from the wall. Fixing means 24, in the form of a tensioning strip, are provided to secure the adapter ring 21 on the gearbox neck 25. For this purpose, the sleeve-like region of the adapter ring can be slotted or include projections which engage a continuous groove in the gearbox neck 25.

The connection between the sleeve 15 and the adapter ring 21 also enables a relative movement between the two parts along the longitudinal axis 5 to carry out a compensating movement when the first joint 2 is articulated. To permit only intentional removal of the first protective cone 6 from the adapter ring 21, the adapter ring 21, at its end entering the sleeve 15, has one or several circumferentially distributed, outwardly projecting projections 26. The sleeve 15, at its free end 28, has corresponding radially inwardly extending securing beads 27 which stop against the projections 26. Only if the protective cone 6 is deliberately acted upon by hand, is it possible to disengage the projections 26 by deformation.

While the above detailed description describes the preferred embodiment of the present invention, the invention is susceptible to modification, variation and alteration without deviating from the scope and fair meaning of the subjoined claims.

What is claimed is:

1. A protective device for a driveshaft, especially a universal-jointed driveshaft, with two universal joints and a connecting shaft connecting the joints, the connecting shaft is telescopic along a longitudinal axis, each universal joint having a protective cone and protective tube, said protective tubes being arranged between said cones, said protective tubes being connected to one another in a rotationally fast way and being displaceable inside one another along the longitudinal axis, one protective cone and one protective tube being rotatably and axially immovably secured to one of said universal joints, first securing means being rotatably connectable to second securing means intended to be fixed to a stationary part of a machine or a similar component;

said first securing means being a sleeve firmly connected to one of said protective cones, said second securing means being an adapter ring and, in an assembled condition, said sleeve and said adapter ring being arranged around one another and connected to one another by holding means, said holding means enabling longitudinal displacement of said sleeve and said adapter ring relative to one another and holding said sleeve and adapter ring in a rotationally fast way relative to one another.

2. A protective device according to claim 1, wherein said sleeve has a bore with inwardly projecting splines which extend parallel to the axis of the bore, and said adapter ring on its outer face having a contour corresponding to the bore and grooves which extend parallel to the axis with said grooves engaged by said splines.

3. A protective device according to claim 1, wherein said sleeve has a cylindrical outer face received in a cylindrical receiving bore of a cone portion of the protective cone.

4. A protective device according to claim 1, wherein said adapter ring towards its end close to the protective cone on its outside has at least one projection which extends radially relative to the axis and said sleeve, at its free end, has a radially outwardly extending securing projection which engages behind said at least one projection.

* * * * *